United States Patent
Yamashita et al.

(10) Patent No.: US 12,516,200 B2
(45) Date of Patent: Jan. 6, 2026

(54) SURFACE TREATMENT AGENT

(71) Applicant: DAIKIN INDUSTRIES, LTD., Osaka (JP)

(72) Inventors: Tsuneo Yamashita, Osaka (JP); Takeshi Maehira, Osaka (JP); Hisashi Mitsuhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 439 days.

(21) Appl. No.: 18/312,262

(22) Filed: May 4, 2023

(65) Prior Publication Data

US 2023/0272227 A1    Aug. 31, 2023

Related U.S. Application Data

(63) Continuation of application No. PCT/JP2021/039876, filed on Oct. 28, 2021.

(30) Foreign Application Priority Data

Nov. 5, 2020   (JP) .................. 2020-185144

(51) Int. Cl.
*C08G 77/06*   (2006.01)
*C08G 77/24*   (2006.01)
*C09D 5/16*    (2006.01)

(52) U.S. Cl.
CPC ........... *C09D 5/1675* (2013.01); *C08G 77/06* (2013.01); *C08G 77/24* (2013.01); *C08G 2150/00* (2013.01)

(58) Field of Classification Search
CPC .............. C09D 5/1675; C08G 2650/48; C08G 65/007; C08G 65/336
See application file for complete search history.

(56) References Cited

U.S. PATENT DOCUMENTS

| | | | |
|---|---|---|---|
| 2015/0307719 A1* | 10/2015 | Mitsuhashi | C07F 7/188 428/447 |
| 2020/0095433 A1 | 3/2020 | Mitsuhashi et al. | |
| 2020/0354520 A1 | 11/2020 | Mitsuhashi et al. | |
| 2022/0010062 A1* | 1/2022 | Yamashita | C09D 171/00 |

FOREIGN PATENT DOCUMENTS

| | | |
|---|---|---|
| EP | 3569673 A1 | 11/2019 |
| JP | 2014-218639 A | 11/2014 |
| WO | 2019/151442 A1 | 8/2019 |

OTHER PUBLICATIONS

International Search Report PCT/JP2021/039876 dated Jan. 18, 2022.
Extended European Search Report dated Oct. 8, 2024 in Application No. 21889121.6.
International Preliminary Report on Patentability with a translation of the Written Opinion dated May 19, 2023 in International Application No. PCT/JP2021/039876.

* cited by examiner

*Primary Examiner* — Mark S Kaucher
(74) *Attorney, Agent, or Firm* — Sughrue Mion, PLLC

(57) ABSTRACT

A fluoropolyether group-containing silane compound represented by the following formula (I): $R^{F1}$—$R^4$—$(OR^3)_m$—$R^5$—$SiR^1{}_n R^2{}_{3-n}$ [wherein the symbols are as described in the specification]. Also disclosed is a surface-treating agent containing the silane compound; a pellet including the surface-treating agent; and an article including a substrate and a layer on a surface of the substrate, wherein the layer is formed of the silane compound or the surface-treating agent.

19 Claims, No Drawings

SURFACE TREATMENT AGENT

CROSS REFERENCE TO RELATED APPLICATIONS

This application is a Rule 53(b) Continuation of International Application No. PCT/JP2021/039876 filed Oct. 28, 2021, claiming priority from Japanese Patent Application No. 2020-185144 filed Nov. 5, 2020, the respective disclosures of all of the above of which are incorporated herein by reference in their entireties.

TECHNICAL FIELD

The present disclosure relates to a surface-treating agent and an article having a layer formed of the surface-treating agent.

BACKGROUND ART

Certain types of fluorine-containing silane compounds are known to be capable of providing excellent water-repellency, oil-repellency, antifouling property, and the like when used in surface treatment of a substrate. A layer obtained from a surface-treating agent containing a fluorine-containing silane compound (hereinafter, also referred to as a "surface-treating layer") is applied as a so-called functional thin film to a large variety of substrates such as glass, plastics, fibers, sanitary articles, and building materials (Patent Literature 1).

CITATION LIST

Patent Literature

Patent Literature 1: JP 2014-218639 A

SUMMARY

The present disclosure includes the following embodiments.

[1] A fluoropolyether group-containing silane compound represented by the following formula (I):

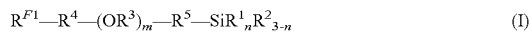

wherein
$R^{F1}$ is $Rf^1$—$R^F$—$O_p$—;
$Rf^1$ is a $C_{1-16}$ alkyl group optionally substituted with one or more fluorine atoms;
$R^F$ is a divalent fluoropolyether group;
p is 0 or 1;
$R^1$ is each independently at each occurrence —Z—$SiR^{11}_qR^{12}_{3-q}$;
Z is a divalent organic group;
$R^{11}$ is each independently at each occurrence a hydroxyl group or a hydrolyzable group;
$R^{12}$ is each independently at each occurrence a hydrogen atom or a monovalent organic group;
q is an integer of 1 to 3;
$R^2$ is a hydrogen atom or a monovalent organic group;
n is 2 or 3;
$R^3$ is a $C_{1-6}$ alkylene group;
m is an integer of 2 to 10;
$R^4$ is a single bond or a $C_{1-6}$ alkylene group; and
$R^5$ is a single bond or a $C_{1-6}$ alkylene group.

Advantageous Effect

According to the present disclosure, it is possible to provide an article having a surface-treating layer having better friction durability and chemical resistance.

DESCRIPTION OF EMBODIMENTS

Below, the fluoropolyether group-containing silane compound of the present disclosure will now be described.

The term "monovalent organic group", as used herein, refers to a monovalent group containing carbon. The monovalent organic group may be, but is not limited to, a hydrocarbon group or a derivative thereof. The derivative of a hydrocarbon group refers to a group that has one or more of N, O, S, Si, amide, sulfonyl, siloxane, carbonyl, carbonyloxy, and the like at the terminal or in the molecular chain of the hydrocarbon group. The term simply referred to as an "organic group" means a monovalent organic group. The "di- to decavalent organic group" refers to a di- to decavalent group containing carbon. The di- to decavalent organic group may be, but is not limited to, a di- to decavalent group obtained by further removing 1 to 9 hydrogen atoms from an organic group. The divalent organic group is not limited, and examples include divalent groups obtained by further removing one hydrogen atom from an organic group.

The term "hydrocarbon group", as used herein, refers to a group that contains a carbon and a hydrogen and that is obtained by removing one hydrogen atom from a hydrocarbon. The hydrocarbon group is not limited, and examples include a $C_{1-20}$ hydrocarbon group optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may contain one or more ring structures.

The substituent of the "hydrocarbon group", as used herein, is not limited, and examples thereof include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_3$-10 unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

As used herein, the "hydrolyzable group" refers to a group capable of undergoing a hydrolysis reaction, i.e., refers to a group that can be eliminated from the main backbone of a compound by a hydrolysis reaction. Examples of the hydrolyzable group include —$OR^h$, —$OCOR^h$, —O—N=$CR^h_2$, —$NR^h_2$, —$NHR^h$, —NCO, and halogen (in these formulae, $R^h$ represents a substituted or unsubstituted $C_{1-4}$ alkyl group).

The fluoropolyether group-containing silane compound of the present disclosure is a fluoropolyether group-containing silane compound represented by the following formula (I):

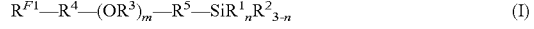

wherein
$R^{F1}$ is $Rf^1$—$R^F$—$O_p$—;
$Rf^1$ is a $C_{1-16}$ alkyl group optionally substituted with one or more fluorine atoms;
$R^F$ is a divalent fluoropolyether group;
p is 0 or 1;
$R^1$ is —Z—$SiR^{11}_qR^{12}_{3-q}$;
Z is a divalent organic group;

$R^{11}$ is a hydroxyl group or a hydrolyzable group;
$R^{12}$ is a hydrogen atom or a monovalent organic group;
q is an integer of 1 to 3;
$R^2$ is a hydrogen atom or a monovalent organic group;
n is 2 or 3;
$R^3$ is a $C_{1-6}$ alkylene group;
m is an integer of 2 to 10;
$R^4$ is a single bond or a $C_{1-6}$ alkylene group; and
$R^5$ is a single bond or a $C_{1-6}$ alkylene group.

The fluoropolyether group-containing silane compound of the present disclosure has —$(OR^3)_m$— between $R^{F1}$ and $SiR^1{}_nR^2{}_{3-n}$ and is, therefore, capable of forming a surface-treating layer having higher friction durability and chemical resistance.

In the formula (I), $R^{F1}$ is $Rf^1$—$R^F$—$O_q$—.

In the formula, $Rf^1$ is a $C_{1-16}$ alkyl group optionally substituted with one or more fluorine atoms.

In the $C_{1-16}$ alkyl group optionally substituted with one or more fluorine atoms, the "$C_{1-16}$ alkyl group" may be linear or branched, and is preferably a linear or branched $C_{1-6}$ alkyl group, in particular $C_{1-3}$ alkyl group, and more preferably a linear $C_{1-6}$ alkyl group, in particular $C_{1-3}$ alkyl group.

$Rf^1$ is preferably a $C_{1-16}$ alkyl group substituted with one or more fluorine atoms, more preferably a $CF_2H$—$C_{1-15}$ perfluoroalkylene group, and even more preferably a $C_{1-16}$ perfluoroalkyl group.

The $C_{1-16}$ perfluoroalkyl group may be linear or branched, and is preferably a linear or branched $C_{1-6}$ perfluoroalkyl group, in particular $C_{1-3}$ perfluoroalkyl group, more preferably a linear $C_{1-6}$ perfluoroalkyl group, in particular $C_{1-3}$ perfluoroalkyl group, and specifically —$CF_3$, —$CF_2CF_3$, or —$CF_2CF_2CF_3$.

In the formula, p is 0 or 1. In one embodiment, p is 0. In another embodiment, p is 1.

In the formula (I), $R^F$ is each independently at each occurrence a divalent fluoropolyether group.

$R^F$ is preferably a group represented by the formula:

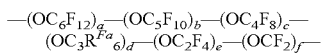

wherein
$R^{Fa}$ is each independently at each occurrence a hydrogen atom, a fluorine atom, or a chlorine atom,
a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula, provided that when all $R^{Fa}$ are hydrogen atoms or chlorine atoms, at least one of a, b, c, e, and f is 1 or more.
$R^{Fa}$ is preferably a hydrogen atom or a fluorine atom, and more preferably a fluorine atom, provided that when all $R^{Fa}$ are hydrogen atoms or chlorine atoms, at least one of a, b, c, e, and f is 1 or more.

Preferably, a, b, c, d, e, and f may be each independently an integer of 0 to 100.

The sum of a, b, c, d, e, and f is preferably 5 or more and more preferably 10 or more, and may be, for example, 15 or more or 20 or more. The sum of a, b, c, d, e, and f is preferably 200 or less, more preferably 100 or less, and even more preferably 60 or less, and may be, for example, 50 or less or 30 or less.

These repeating units may be linear or branched. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, or the like. —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, or the like. —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$—, and —$(OCF_2CF(C_2F_5))$—. —$(OC_3F_6)$— (i.e., in the above formula, $R^{Fa}$ is a fluorine atom) may be any of —$(OCF_2CF_2CF_2)$—, —$(OCF(CF_3)CF_2)$—, and —$(OCF_2CF(CF_3))$—. —$(OC_2F_4)$— may be any of —$(OCF_2CF_2)$— and —$(OCF(CF_3))$—.

In one embodiment, the repeating unit is linear. When the repeating unit is linear, the surface lubricity, friction durability, and the like of the surface-treating layer can be increased.

In one embodiment, the repeating unit is branched. When the repeating unit is branched, the dynamic friction coefficient of the surface-treating layer can be increased.

In one embodiment, $R^F$ is each independently at each occurrence a group represented by any of the following formulae (f1) to (f5):

wherein d is an integer of 1 to 200; and e is 0 or 1;

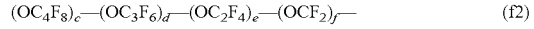

wherein c and d are each independently an integer of 0 or more and 30 or less; e and f are each independently an integer of 1 or more and 200 or less;
the sum of c, d, e, and f is 2 or more; and
the occurrence order of the respective repeating units enclosed in parentheses provided with a subscript c, d, e, or f is not limited in the formula;

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or is a combination of two or three groups independently selected from these groups; and
g is an integer of 2 to 100;

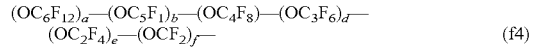

where e is an integer of 1 or more and 200 or less; a, b, c, d, and f are each independently an integer of 0 or more and 200 or less; and the occurrence order of the respective repeating units enclosed in parentheses provided with a, b, c, d, e, or f is not limited in the formula; and

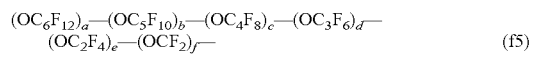

wherein f is an integer of 1 or more and 200 or less; a, b, c, d, and e are each independently an integer of 0 or more and 200 or less; and the occurrence order of the respective repeating units enclosed in parentheses provided with a, b, c, d, e, or f is not limited in the formula.

In the formula (f1), d is preferably 5 to 200, more preferably 10 to 100, and even more preferably 15 to 50, and is, for example, an integer of 25 to 35. $OC_3F_6$ in the formula (f1) is preferably ($OCF_2CF_2CF_2$), ($OCF(CF_3)CF_2$), or ($OCF_2CF(CF_3)$), and more preferably ($OCF_2CF_2CF_2$). $OC_2F_4$ in the formula (f1) is preferably ($OCF_2CF_2$) or ($OCF(CF_3)$), and more preferably ($OCF_2CF_2$). In one embodiment, e is 0. In another embodiment, e is 1.

In the formula (f2), e and f are each independently an integer of preferably 5 or more and 200 or less, and more preferably 10 to 200. The sum of c, d, e, and f is preferably 5 or more, and more preferably 10 or more, and may be, for example, 15 or more or 20 or more. In one embodiment, the formula (f2) is preferably a group represented by —$(OCF_2CF_2CF_2CF_2)_c$—$(OCF_2CF_2CF_2)_d$—$(OCF_2CF_2)_e$—$(OCF_2)_f$—. In another embodiment, the formula (f2) may be a group represented by —$(OC_2F_4)_e$—$(OCF_2)_f$—.

In the formula (f3), $R^6$ is preferably $OC_2F_4$. In the formula (f3), $R^7$ is preferably a group selected from $OC_2F_4$, $OC_3F_6$, and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula (f3), g is an integer of preferably 3 or more, and more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably —$(OC_2F_4$—$OC_3F_6)_g$— or —$(OC_2F_4$—$OC_4F_8)_g$—.

In the formula (f4), e is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In the formula (f5), f is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

In $R^F$, the ratio of e to f (hereinafter, referred to as an "e/f ratio") is 0.1 to 10, preferably 0.2 to 5, more preferably 0.2 to 2, even more preferably 0.2 to 1.5, and further preferably 0.2 to 0.85. With an e/f ratio of 10 or less, the lubricity, friction durability, and chemical resistance (such as durability against artificial sweat) of a surface-treating layer obtained from the compound are further increased. The smaller the e/f ratio is, the higher the lubricity and the friction durability of the surface-treating layer are. On the other hand, with an e/f ratio of 0.1 or more, the stability of the compound can be further increased. The greater the e/f ratio is, the greater the stability of the compound is.

In one embodiment, the e/f ratio is preferably 0.2 to 0.95, and more preferably 0.2 to 0.9.

In one embodiment, from the viewpoint of heat resistance, the e/f ratio is preferably 1.0 or more, and more preferably 1.0 to 2.0.

In the fluoropolyether group-containing silane compound, the number average molecular weight of the $R^{F1}$ moiety is, but is not limited to, for example, 500 to 30,000, preferably 1,500 to 30,000, and more preferably 2,000 to 10,000. Herein, the number average molecular weight of $R^{F1}$ and $R^{F2}$ is a value obtained by $^{19}$F-NMR measurement.

In another embodiment, the number average molecular weight of the $R^{F1}$ moiety may be 500 to 30,000, preferably 1,000 to 20,000, more preferably 2,000 to 15,000, and even more preferably 2,000 to 10,000, such as 3,000 to 6,000.

In another embodiment, the number average molecular weight of the $R^{F1}$ moiety may be 4,000 to 30,000, preferably 5,000 to 10,000, and more preferably 6,000 to 10,000.

In the formula (I), $R^1$ is —Z—$SiR^{11}_q R^{12}_{3-q}$.

In the formula, Z is a divalent organic group.

Z is preferably a $C_{1-6}$ alkylene group, —$(CH_2)_{z1}$—O—$(CH_2)_{z2}$— (wherein z1 is an integer of 0 to 6 such as an integer of 1 to 6, and z2 is an integer of 0 to 6 such as an integer of 1 to 6), or —$(CH_2)_{z3}$-phenylene-$(CH_2)_{z4}$— (wherein z3 is an integer of 0 to 6 such as an integer of 1 to 6, and z4 is an integer of 0 to 6 such as an integer of 1 to 6). Such a $C_{1-6}$ alkylene group may be linear or branched, and is preferably linear. These groups may be optionally substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferable embodiment, $Z^1$ is a $C_{1-6}$ alkylene group or —$(CH_2)_{z3}$-phenylene-$(CH_2)_{z4}$—, and preferably -phenylene-$(CH_2)_{z4}$—. When $Z^1$ is such a group, light resistance, in particular ultraviolet resistance, can be more increased.

In another preferable embodiment, Z is a $C_{1-3}$ alkylene group. In one embodiment, Z may be —$CH_2CH_2CH_2$—. In another embodiment, Z may be —$CH_2CH_2$—.

In the formulae, $R^{11}$ is each independently at each occurrence a hydroxyl group or a hydrolyzable group.

Preferably, $R^{11}$ is each independently at each occurrence a hydrolyzable group.

Preferably, $R^{11}$ is each independently at each occurrence —$OR^h$, —$OCOR^h$, —O—N=$CR^h_2$, —$NR^h_2$, —$NHR^h$, —NCO, or halogen (in these formulae, $R^h$ represents a substituted or unsubstituted $C_{1-4}$ alkyl group), and more preferably —$OR^h$ (i.e., an alkoxy group). Examples of $R^h$ include unsubstituted alkyl groups such as a methyl group, an ethyl group, a propyl group, an isopropyl group, a n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^h$ is a methyl group, and in another embodiment, $R^h$ is an ethyl group.

In the formula, $R^{12}$ is each independently at each occurrence a hydrogen atom or a monovalent organic group. The monovalent organic group is a monovalent organic group excluding the hydrolyzable group.

In $R^{12}$, the monovalent organic group is preferably a $C_{1-20}$ alkyl group, more preferably a $C_{1-6}$ alkyl group, even more preferably a $C_{1-3}$ alkyl group, and particularly preferably a methyl group.

In the formula, q is each independently an integer of 1 to 3, preferably 2 to 3, and more preferably 3 for each (—$SiR^{11}_q R^{12}_{3-q}$) unit.

In the formula (I), $R^2$ is a hydrogen atom or a monovalent organic group. The monovalent organic group is a monovalent organic group excluding the hydrolyzable group.

In $R^2$, the monovalent organic group is preferably a $C_{1-20}$ alkyl group, more preferably a $C_{1-6}$ alkyl group, even more preferably a $C_{1-3}$ alkyl group, and particularly preferably a methyl group.

In the formula (I), n is 2 or 3. In one embodiment, n is 2. In another embodiment, n is 3.

In the formula (I), $R^3$ is a $C_{1-6}$ alkylene group.

In $R^3$, the $C_{1-6}$ alkylene group may be linear or branched, and is preferably linear.

$R^3$ is preferably a $C_{1-4}$ alkylene group, more preferably a $C_{1-3}$ alkylene group, and particularly preferably —$CH_2CH_2$—. With such an $R^3$ group, substrate adhesion and wettability can be increased.

In $R^3$, the $C_{1-6}$ alkylene group may be linear or branched, and is preferably linear.

In the formula (I), m is an integer of 2 to 10, preferably an integer of 2 to 6, and more preferably an integer of 2 to 4. With m being within such a range, substrate adhesion and wettability can be increased.

In the formula (I), $R^4$ is a single bond or a $C_{1-6}$ alkylene group.

In $R^4$, the $C_{1-6}$ alkylene group may be linear or branched, and is preferably linear.

$R^4$ is preferably a $C_{1-6}$ alkylene group, more preferably a $C_{1-3}$ alkylene group, and particularly preferably a methylene group.

In the formula (I), $R^5$ is a single bond or a $C_{1-6}$ alkylene group.

In $R^5$, the $C_{1-6}$ alkylene group may be linear or branched, and is preferably linear.

$R^5$ is preferably a $C_{1-6}$ alkylene group, more preferably a $C_{1-3}$ alkylene group, and particularly preferably a methylene group.

The average molecular weight of the fluoropolyether group-containing silane compound represented by the formula (I) may be, but is not limited to, $5\times10^2$ to $1\times10^5$. In particular, the average molecular weight is preferably 2,000 to 32,000 and more preferably 2,500 to 12,000 from the viewpoint of friction durability. Herein, the "average molecular weight" refers to a number average molecular weight, and the "average molecular weight" is a value obtained by $^{19}$F-NMR measurement.

The fluoropolyether group-containing silane compound represented by the formula (I) can be produced from, for example, a fluoropolyether group-containing alcohol by a method known per se.

Next, the surface-treating agent of the present invention will now be described.

The surface-treating agent of the present disclosure contains at least one fluoropolyether group-containing silane compound represented by the formula (I).

The surface-treating agent of the present disclosure can impart water-repellency, oil-repellency, antifouling property, friction durability, and chemical resistance to a substrate, and may be suitably used as, but is not limited to, an antifouling coating agent or a water-proof coating agent.

The surface-treating agent of the present disclosure may contain a solvent, an (unreactive) fluoropolyether compound which can be understood as a fluorine-containing oil, preferably a perfluoro (poly) ether compound (hereinafter, collectively referred to as a "fluorine-containing oil"), an (unreactive) silicone compound which can be understood as a silicone oil (hereinafter, referred to as a "silicone oil"), an alcohol, a catalyst, a surfactant, a polymerization inhibitor, a sensitizer, and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, HFE 7300, $CF_3CH_2OH$, $CF_3CF_2CH_2OH$, and $(CF_3)_2CHOH$. Alternatively, the solvent may be a mixed solvent of two or more of such solvents.

Examples of the fluorine-containing oil include, but are not limited to, a compound (a perfluoro(poly)ether compound) represented by the following general formula (3):

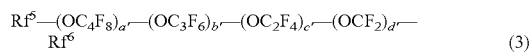
(3)

wherein $Rf^5$ represents an alkyl group having 1 to 16 carbon atoms optionally substituted with one or more fluorine atoms (preferably, a $C_{1-16}$ perfluoroalkyl group), $Rf^6$ represents an alkyl group having 1 to 16 carbon atoms optionally substituted with one or more fluorine atoms (preferably, a $C_{1-16}$ perfluoroalkyl group), a fluorine atom, or a hydrogen atom, and $Rf^5$ and $Rf^6$ are more preferably, each independently, a $C_{1-3}$ perfluoroalkyl group; and a', b', c' and d' represent the numbers of four repeating units in perfluoro(poly)ether constituting the main backbone of the polymer, respectively, and are mutually independently an integer of 0 or more and 300 or less, the sum of a', b', c' and d' is at least 1, preferably 1 to 300, and more preferably 20 to 300. The occurrence order of the respective repeating units in parentheses provided with a subscript a', b', c', or d' is not limited in the formula. Among these repeating units, —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$—, and —$(OCF_2CF(C_2F_5))$—, and is preferably —$(OCF_2CF_2CF_2CF_2)$—. —$(OC_3F_6)$— may be any of —$(OCF_2CF_2CF_2)$—, —$(OCF(CF_3)CF_2)$—, and —$(OCF_2CF(CF_3))$—, and is preferably —(OCF$_2$CF$_2$CF$_2$)—. —(OC$_2$F$_4$)— may be any of —(OCF$_2$CF$_2$)— and —(OCF(CF$_3$))—, and is preferably —(OCF$_2$CF$_2$)—.

Examples of the perfluoro(poly)ether compound represented by the general formula (3) include a compound represented by any of the following general formulae (3a) and (3b) (which may be a single compound or a mixture of two or more compounds):

(3a)

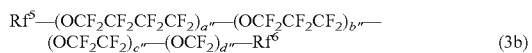

(3b)

In these formulae, Rf$^5$ and Rf$^6$ are as described above; in formula (3a), b" is an integer of 1 or more and 100 or less; and, in formula (3b), a" and b" are each independently an integer of 0 or more and 30 or less, c"and d" are each independently an integer of 1 or more and 300 or less. The occurrence order of the respective repeating units enclosed in parentheses accompanied by a subscript a", b", c", or d" is not limited in the formula.

From another viewpoint, the fluorine-containing oil may be a compound represented by general formula Rf$^3$—F wherein Rf$^3$ is a C$_{5-16}$ perfluoroalkyl group. The fluorine-containing oil may be a chlorotrifluoroethylene oligomer.

The fluorine-containing oil may have an average molecular weight of 500 to 10,000. The molecular weight of the fluorine-containing oil may be measured with GPC.

The fluorine-containing oil may be contained in an amount of, for example, 0 to 50 mass %, preferably 0 to 30 mass %, and more preferably 0 to 5 mass % based on the surface-treating agent of the present disclosure. In one embodiment, the surface-treating agent of the present disclosure is substantially free of the fluorine-containing oil. Being substantially free of the fluorine-containing oil means that the fluorine-containing oil is not contained at all, or an extremely small amount of the fluorine-containing oil may be contained.

In one embodiment, the average molecular weight of the fluorine-containing oil may be greater than the average molecular weight of the fluorine-containing silane compound. With such average molecular weights, better friction durability and surface lubricity can be obtained when forming the surface-treating layer by a vacuum deposition method.

In one embodiment, the average molecular weight of the fluorine-containing oil may be smaller than the average molecular weight of the fluorine-containing silane compound. With such average molecular weights, a cured product having high friction durability and high surface lubricity can be formed while suppressing deterioration of the transparency of the surface-treating layer obtained from the compound.

The fluorine-containing oil contributes to increasing the surface lubricity of the layer formed of the surface-treating agent of the present disclosure.

For example, the silicone oil may be a linear or cyclic silicone oil having 2,000 or less siloxane bonds. The linear silicone oil may be a so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying straight silicone oil with alkyl, aralkyl, polyether, higher fatty acid ester, fluoroalkyl, amino, epoxy, carboxyl, alcohol, or the like. Examples of the cyclic silicone oil include cyclic dimethylsiloxane oil.

In the surface-treating agent of the present disclosure, the silicone oil may be contained in an amount of, for example, 0 to 300 parts by mass, and preferably 50 to 200 parts by mass, based on total 100 parts by mass of the fluoropolyether group-containing silane compound of the present disclosure (in the case of two or more kinds, the total thereof, and the same applies below).

The silicone oil contributes to increasing the surface lubricity of the surface-treating layer.

Examples of the alcohol include alcohols having 1 to 6 carbon atoms optionally substituted with one or more fluorine atoms, such as methanol, ethanol, iso-propanol, tert-butanol, CF$_3$CH$_2$OH, CF$_3$CF$_2$CH$_2$OH, and (CF$_3$)$_2$CHOH. Such an alcohol added to the surface-treating agent increases the stability of the surface-treating agent and improves the miscibility between the fluoropolyether group-containing silane compound and the solvent.

The alcohol is contained in the surface-treating agent in an amount of preferably 0.1 to 5 times, more preferably 0.5 to 3 times, and even more preferably 0.8 to 1.2 times the metal compound in terms of molar ratio. With the alcohol content being within the above range, the stability of the surface-treating layer can be more increased.

Examples of the catalyst include acids (such as acetic acid and trifluoroacetic acid), bases (such as ammonia, triethylamine, and diethylamine), and transition metals (such as Ti, Ni, and Sn).

The catalyst promotes hydrolysis and dehydrative condensation of the fluorine-containing silane compound of the present disclosure, and promotes formation of a layer formed of the surface-treating agent of the present disclosure.

Examples of further components include, in addition to those described above, tetraethoxysilane, methyltrimethoxysilane, 3-aminopropyltrimethoxysilane, 3-glycidoxypropyltrimethoxysilane, and methyltriacetoxysilane.

The surface-treating agent of the present disclosure can be formed into pellets by impregnating a porous material such as a porous ceramic material or a metal fiber such as a fiber obtained by, for example, solidifying steel wool in a cotton-like form with the surface-treating agent. Such pellets can be used in, for example, vacuum deposition.

The surface-treating agent of the present disclosure may contain, in addition to the components described above, trace amounts of Pt, Rh, Ru, 1,3-divinyltetramethyldisiloxane, triphenylphosphine, NaCl, KCl, silane condensates, and the like as impurities.

Below, the article of the present disclosure will be described.

The article of the present disclosure comprises a substrate and a layer (a surface-treating layer) on the substrate surface, the layer being formed of the compound or surface-treating agent of the present disclosure.

The substrate usable in the present disclosure may be composed of any suitable material such as glass, resin (which may be natural or synthetic resin such as a commonly used plastic material), metal, ceramics, semiconductors (such as silicon and germanium), fiber (such as woven fabric and nonwoven fabric), fur, leather, wood, pottery, stone, building materials, and sanitary articles.

For example, when the article to be produced is an optical member, the material constituting the surface of the substrate may be a material for an optical member, such as glass or a transparent plastic. When the article to be produced is an optical member, some layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances usable in the antireflection layer include $SiO_2$, $SiO$, $ZrO_2$, $TiO_2$, $TiO$, $Ti_2O_3$, $TiZO_5$, $Al_2O_3$, $Ta_2O_5$, $Ta_3O_5$, $Nb_2O_5$, $HfO_2$, $Si_3N_4$, $CeO_2$, $MgO$, $Y_2O_3$, $SnO_2$, $MgF_2$, and $WO_3$. One of these inorganic substances may be used singly, or two or more may be used in combination (e.g., as a mixture). In the case of a multi-layer antireflection layer, $SiO_2$ and/or $SiO$ is preferably used in the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I-CON), an atomizing film layer, a hard coating layer, a polarizing film, a phase difference film, a liquid crystal display module, or the like.

The shape of the substrate is not limited, and may be, for example, in the form of a plate, a film, or the like. The surface region of the substrate on which a surface-treating layer is to be formed is at least a part of the substrate surface, and may be suitably determined according to the application, specific specifications, and the like of an article to be produced.

In one embodiment, the substrate, or at least the surface portion thereof, may be composed of a material originally having a hydroxyl group. Examples of the material include glass as well as metal (in particular, base metal) wherein a natural oxidized film or a thermal oxidized film is formed on the surface, ceramics, semiconductors, and the like. Alternatively, when the substrate has an insufficient amount of a hydroxyl group or when the substrate originally does not have a hydroxyl group as in resin and the like, a pre-treatment may be performed on the substrate to thereby introduce or increase a hydroxyl group on the surface of the substrate. Examples of such a pre-treatment include a plasma treatment (e.g., corona discharge) and ion beam irradiation. The plasma treatment can be suitably utilized to not only introduce or increase a hydroxyl group on the substrate surface, but also clean the substrate surface (remove foreign matter and the like). Another example of the pre-treatment includes a method wherein a monolayer of a surface adsorbent having a carbon-carbon unsaturated bonding group is formed on the substrate surface by a LB method (a Langmuir-Blodgett method), a chemical adsorption method, or the like beforehand, and thereafter cleaving the unsaturated bond under an atmosphere containing oxygen, nitrogen, or the like.

In another embodiment, the substrate, or at least the surface portion thereof, may be composed of a material comprising another reactive group such as a silicone compound having one or more Si—H group or alkoxysilane.

In a preferable embodiment, the substrate is glass. The glass is preferably sapphire glass, soda-lime glass, alkali aluminosilicate glass, borosilicate glass, alkali-free glass, crystal glass, or quartz glass, and is particularly preferably chemically strengthened soda-lime glass, chemically strengthened alkali aluminosilicate glass, or chemically bonded borosilicate glass.

The article of the present disclosure can be produced by forming a layer of the compound or surface-treating agent of the present disclosure on the surface of the substrate and optionally post-treating the layer, thereby forming a layer from the surface-treating agent of the present disclosure.

The layer of the surface-treating agent of the present disclosure can be formed by applying the surface-treating agent to the surface of the substrate so as to coat the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the wet coating method, the surface-treating agent of the present disclosure can be applied to the substrate surface after being diluted with a solvent. From the viewpoint of the stability of the composition of the present disclosure and the volatility of solvents, the following solvents are preferably used: perfluoroaliphatic hydrocarbons having 5 to 12 carbon atoms (such as perfluorohexane, perfluoromethylcyclohexane, and perfluoro-1,3-dimethylcyclohexane); polyfluoroaromatic hydrocarbons (such as bis (trifluoromethyl)benzene); polyfluoroaliphatic hydrocarbons (such as $C_6F_{13}CH_2CH_3$ (such as Asahiklin (registered trademark) AC-6000 manufactured by Asahi Glass Co., Ltd.), and 1,1,2,2,3,3,4-heptafluorocyclopentane (such as Zeorora (registered trademark) H manufactured by Zeon Corporation)); alkyl perfluoroalkyl ethers (the perfluoroalkyl group and the alkyl group may be straight or branched) such as hydrofluoroether (HFE) (such as perfluoropropylmethyl ether ($C_3F_7OCH_3$) (such as Novec (trademark) 7000 manufactured by Sumitomo 3M Limited), perfluorobutyl methyl ether ($C_4F_9OCH_3$) (such as Novec (trademark) 7100 manufactured by Sumitomo 3M Limited), perfluorobutyl ethyl ether ($C_4F_9OC_2H_5$) (such as Novec (trademark) 7200 manufactured by Sumitomo 3M Limited), and perfluorohexyl methyl ether ($C_2F_5CF(OCH_3)C_3F_7$) (such as Novec (trademark) 7300 manufactured by Sumitomo 3M Limited), or $CF_3CH_2OCF_2CHF_2$ (such as Asahiklin (registered trademark) AE-3000 manufactured by Asahi Glass Co., Ltd.)). One of these solvents can be used singly, or two or more can be used as a mixture. Among them, hydrofluoroether is preferable, and perfluorobutyl methyl ether ($C_4F_9OCH_3$) and/or perfluorobutyl ethyl ether ($C_4F_9OC_2H_5$) is particularly preferable.

When using the dry coating method, the surface-treating agent of the present disclosure may be directly subjected to the dry coating method, or may be diluted with the above solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition)

treatment, wherein the pellet is obtained by impregnating a porous body of metal such as iron or copper with the surface-treating agent of the present disclosure to which the catalyst has been added.

The catalyst may be any suitable acid or base. The acid catalyst may be, for example, acetic acid, formic acid, or trifluoroacetic acid. The base catalyst may be, for example, ammonia or organic amine.

The surface-treating layer included in the article of the present disclosure has both high friction durability and high chemical resistance. Moreover, surface-treating layer may have not only high friction durability and chemical resistance but also have, depending on the formulation of the surface-treating agent used, water-repellency, oil-repellency, antifouling property (e.g., preventing grime such as fingerprints from adhering), waterproof property (preventing water from entering electronic components and the like), surface lubricity (or lubricity, for example, such as removability by wiping of grim such as fingerprints, and excellent tactile sensations to the fingers), and the like, and may be suitably used as a functional thin film.

Accordingly, the present disclosure further relates to an optical material having the surface-treating layer as the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article of the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article of the present disclosure may be medical equipment or a medical material.

The article having a layer that is obtained according to the present disclosure may be an automobile interior or exterior member. Examples of the exterior material include the following: windows, light covers, and external camera covers. Examples of the interior material include the following: instrument panel covers, navigation system touch panels, and decorative interior materials.

The thickness of the layer is not limited. The thickness of the layer in the case of an optical member is in the range of 1 to 50 nm, 1 to 30 nm, and preferably 1 to 15 nm, from the viewpoint of optical performance, surface lubricity, friction durability, and antifouling property.

The article of the present disclosure has been described in detail above. The article of the present disclosure, the method for producing the article, and the like are not limited to those exemplified above.

The present disclosure includes the following embodiments.

[1] A fluoropolyether group-containing silane compound represented by the following formula (I):

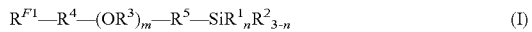
(I)

wherein
$R^{F1}$ is $Rf^1-R^F-O_p-$;
$Rf^1$ is a $C_{1-16}$ alkyl group optionally substituted with one or more fluorine atoms;
$R^F$ is a divalent fluoropolyether group;
p is 0 or 1;
$R^1$ is each independently at each occurrence $-Z-SiR^{11}{}_qR^{12}{}_{3-q}$;
Z is a divalent organic group;
$R^{11}$ is each independently at each occurrence a hydroxyl group or a hydrolyzable group;
$R^{12}$ is each independently at each occurrence a hydrogen atom or a monovalent organic group;
q is an integer of 1 to 3;
$R^2$ is a hydrogen atom or a monovalent organic group;
n is 2 or 3;
$R^3$ is a $C_{1-6}$ alkylene group;
m is an integer of 2 to 10;
$R^4$ is a single bond or a $C_{1-6}$ alkylene group; and
$R^5$ is a single bond or a $C_{1-6}$ alkylene group.

[2] The fluoropolyether group-containing silane compound according to [1], wherein $Rf^1$ is a $C_{1-16}$ perfluoroalkyl group.

[3] The fluoropolyether group-containing silane compound according to [1] or [2], wherein $R^F$ is a group represented by the following formula:

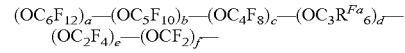

wherein $R^{Fa}$ is each independently at each occurrence a hydrogen atom, a fluorine atom, or a chlorine atom, and
a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula, provided that when all $R^{Fa}$ are hydrogen atoms or chlorine atoms, at least one of a, b, c, e, and f is 1 or more.

[4] The fluoropolyether group-containing silane compound according to [3], wherein $R^{Fa}$ is a fluorine atom.

[5] The fluoropolyether group-containing silane compound according to any one of [1] to [4], wherein $R^F$ is each independently at each occurrence a group represented by the following formula (f1), (f2), (f3), (f4), or (f5):

(f1)

wherein d is an integer of 1 to 200; and e is 0 or 1;

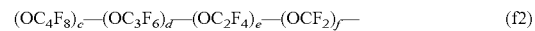
(f2)

wherein c and d are each independently an integer of 0 to 30;
e and f are each independently an integer of 1 to 200;
the sum of c, d, e, and f is an integer of 10 to 200; and
the occurrence order of the respective repeating units enclosed in parentheses provided with a subscript c, d, e, or f is not limited in the formula;

(f3)

wherein $R^6$ is $OCF_2$ or $OC_2F_4$;
$R^7$ is a group selected from $OC_2F_4$, $OC_3F_6$, $OC_4F_8$, $OC_5F_{10}$, and $OC_6F_{12}$, or is a combination of two or three groups selected from these groups; and
g is an integer of 2 to 100;

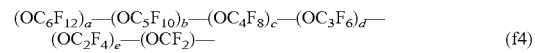
(f4)

wherein e is an integer of 1 or more and 200 or less; a, b, c, d, and f are each independently an integer of 0 or more and 200 or less; and the occurrence order of the respective repeating units enclosed in parentheses provided with a, b, c, d, e, or f is not limited in the formula; and

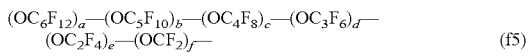

wherein f is an integer of 1 or more and 200 or less; a, b, c, d, and e are each independently an integer of 0 or more and 200 or less; and the occurrence order of the respective repeating units enclosed in parentheses provided with a, b, c, d, e, or f is not limited in the formula.

[6] The fluoropolyether group-containing silane compound according to any one of [1] to [5], wherein $R^3$ is a $C_{1-3}$ alkylene group.

[7] The fluoropolyether group-containing silane compound according to any one of [1] to [6], wherein m is an integer of 2 to 6.

[8] The fluoropolyether group-containing silane compound according to any one of [1] to [7], wherein Z is a $C_{1-6}$ alkylene group.

[9] The fluoropolyether group-containing silane compound according to any one of [1] to [8], wherein q is 3.

[10] A surface-treating agent comprising the fluoro (poly) ether group-containing silane compound according to any one of [1] to [9].

[11] The surface-treating agent according to [10], further comprising one or more further components selected from a fluorine-containing oil, a silicone oil, and a catalyst.

[12] The surface-treating agent according to [10] or [11], further comprising a solvent.

[13] The surface-treating agent according to any one of [10] to [12], which is used as an antifouling coating agent or a water-proof coating agent.

[14] The surface-treating agent according to any one of [10] to [13], which is used for vacuum deposition.

[15] A pellet comprising the surface-treating agent according to any one of [10] to [14].

[16] An article comprising a substrate and a layer on a surface of the substrate, wherein the layer is formed of the fluoropolyether group-containing silane compound according to any one of [1] to [9] or the surface-treating agent according to any one of [10] to [14].

[17] The article according to [16], which is an optical member.

EXAMPLES

The polyether group-containing compound of the present disclosure will now be described more specifically by way of the following Examples, but the present disclosure is not limited to the Examples. In the Examples, the occurrence order of the repeating units constituting perfluoropolyether is not limited, and the chemical formulae shown below indicate average compositions.

Synthetic Example 1

First, 3.0 g of $CF_3$—$(OCF_2CF_2)_m$—$(OCF_2)_n$—$CH_2OH$ (m≈21, n≈35) was dissolved in 1.5 g of 1,3-bis(trifluoromethyl)benzene and 3.0 g of diethylene glycol dimethyl ether. Then, 0.4 g of sodium hydroxide was added thereto, the mixture was stirred at 80° C. for 2 hours, 0.3 g of bromoacetic acid was added while vigorously stirring the mixture, and then the mixture was further stirred at 110° C. for 8 hours. The end point of the reaction was confirmed by $^{19}$F-NMR according to that the chemical shift of the hydroxyl group β position —$CF_2$— of $CF_3(OCF_2CF_2)_m$—$(OCF_2)_nCH_2OH$ shifted to a low magnetic field, and by $^1$H-NMR according to that the methylene proton at the carbonyl group α position of bromoacetic acid shifted to a high magnetic field. The reaction solution was cooled to room temperature, and separated into a liquid phase and a solid phase. The liquid phase was removed, 10 g of AK-225 was added to the solid phase, 10 g of a 1 N hydrochloric acid solution was added while stirring the mixture, and the mixture was stirred for 30 minutes. Then, 1 ml of a 10 wt % aqueous sulfuric acid solution was added, the mixture after being stirred for 20 minutes was left to stand still, and the lower layer was separated. The lower layer was washed with water twice, dried over magnesium sulfate, filtered, and concentrated. The resulting concentrate was dissolved in perfluorohexane. The solution was washed with acetone three times, and thus a polyether group-containing compound (A) was obtained.

Polyether Group-Containing Compound (A):

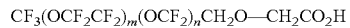

(m≈21, n≈35)

Synthetic Example 2

First, 0.2 g of sodium borohydride and 0.2 g of boron trifluoride diethyl etherate were dispersed in a mixed solvent of 3.0 g of 1,3-bis(trifluoromethyl)benzene and 3.0 g of diethylene glycol dimethyl ether, and heated to 130° C. To this mixture was added dropwise 3.0 g of the polyether group-containing compound (A) obtained in Synthetic Example 1 dissolved in 5.0 g of 1,3-bis(trifluoromethyl) benzene. The reaction mixture was stirred at 130° C. for 3 hours. The end point of the reaction was confirmed by $^{19}$F-NMR according to that the chemical shift of the ether group β position —$CF_2$— of $CF_{30}$—$(CF_2CF_{20})_m$—$(CF_{20})_n$—$CF_2CH_2O$— shifted to a high magnetic field. The reaction solution was returned to room temperature, 3.0 g of acetone was added, the mixture was stirred for 1 hour, and 3 ml of 1 N hydrochloric acid was added. The separated lower layer was washed with water, dried over magnesium sulfate, filtered, and concentrated. The resulting concentrate was dissolved in perfluorohexane and washed with acetone three times, and thus a polyether group-containing compound (B) was obtained.

Polyether Group-Containing Compound (B):

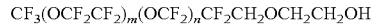

(m≈21, n≈35)

Synthetic Example 3

First, 3.0 g of the polyether group-containing compound (B) obtained in Synthetic Example 2 was dissolved in 6 g of 1,3-bis(trifluoromethyl)benzene, then 0.4 g of sodium hydroxide was added, and the mixture was stirred at 80° C. for 1 hour. To this solution was added 0.5 g of $CH_2$=$CH_2CH_2OCH_2CH_2OTf$ (wherein Tf is a trifluoromethanesulfonyl group), and reacted at 80° C. for 1 hour. The end point of the reaction was confirmed by $^1$H-NMR according to that the chemical shift of the terminal hydroxyl group α position —$CH_2$— of the compound (B) was observed to shift to a low magnetic field. The reaction solution was returned to room temperature, and 3 ml of 1 N hydrochloric acid was added. The separated lower layer was washed with water, dried over magnesium sulfate, filtered, and concentrated, and thus a polyether group-containing compound (C) was obtained.

Polyether Group-Containing Compound (C)

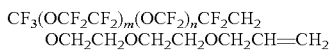

(m≈21, n≈35)

Synthetic Example 4

First, 2.5 g of the polyether group-containing compound (C) obtained in Synthetic Example 3 was dissolved in 5 g of 1,3-bis(trifluoromethyl)benzene, then 0.01 g of triacetoxymethylsilane and 0.04 ml of a xylene solution containing 2% Pt complex of 1,3-divinyl-1,1,3,3-tetramethyldisiloxane were added, 0.4 g of trichlorosilane was introduced, and the mixture was stirred at 10° C. for 30 minutes. Subsequently, the mixture was heated to 60° C. and stirred for 4 hours. After confirming that no proton at the allyl position was observed by $^1$H-NMR, volatile substances was distilled off under reduced pressure. This reaction solution was ice-cooled, 3.0 ml of allylmagnesium bromide (0.7 mol/L diethyl ether solution) was added dropwise, and the mixture was reacted at room temperature overnight. Then, 1.0 ml of methanol and 5 ml of perfluorohexane were added to the reaction solution, filtered, and separated, and the lower layer was concentrated. The resulting concentrate was dissolved in perfluorohexane and washed with acetone three times, and thus a polyether group-containing compound (D) was obtained.

Polyether Group-Containing Compound (D):

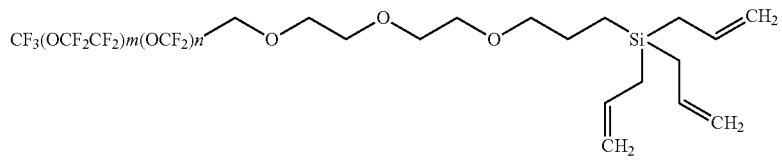

(m ≈ 21, n ≈ 35)

Synthetic Example 5

First, 2.5 g of the polyether group-containing compound (D) obtained in Synthetic Example 4 was dissolved in 5 ml of 1,3-bis(trifluoromethyl)benzene, then 0.01 g of triacetoxymethylsilane and 0.03 ml of a xylene solution containing 2% Pt complex of 1,3-divinyl-1,1,3,3-tetramethyldisiloxane were added, 0.5 g of trichlorosilane was introduced, and the mixture was stirred at 10° C. for 30 minutes. Subsequently, the mixture was heated to 60° C. and stirred for 4 hours. Thereafter, volatile matter was distilled off under reduced pressure, then a mixed solution of 0.1 g of methanol and 1.0 g of trimethyl orthoformate was added, and the mixture was heated to 60° C. and stirred for 3 hours. Thereafter, purification was performed, and thus the following polyether group-containing compound (E) having trimethoxysilyl groups at terminals was obtained.

Polyether Group-Containing Compound (E)

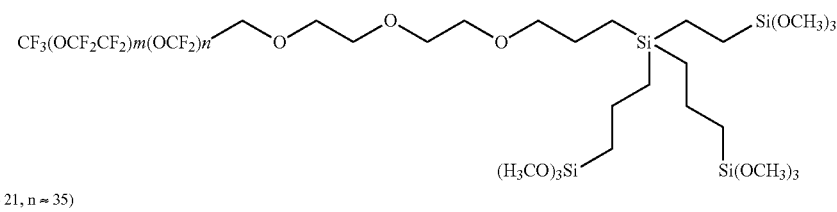

(m ≈ 21, n ≈ 35)

Synthetic Example 6

A polyether group-containing compound (F) was obtained in the same manner as in Synthetic Example 3 except that 3.0 g of $CF_3$—$(OCF_2CF_2)_m$—$(OCF_2)_n$—$CH_2OH$ (m≈21 and n≈35) was used.

Polyether Group-Containing Compound (F)

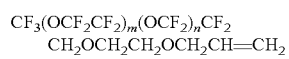

(m≈21, n≈35)

Synthetic Example 7

A polyether group-containing compound (G) was obtained in the same manner as in Synthetic Example 4 except that 2.5 g of the polyether group-containing compound (F) was used.

Polyether Group-Containing Compound (G):

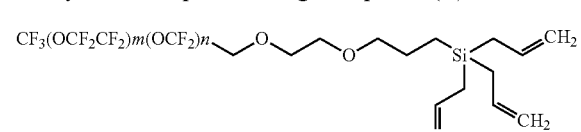

(m ≈ 21, n ≈ 35)

Synthetic Example 8

A polyether group-containing compound (H) was obtained in the same manner as in Synthetic Example 5 except that 2.5 g of the polyether group-containing compound (G) was used.

Polyether Group-Containing Compound (H)

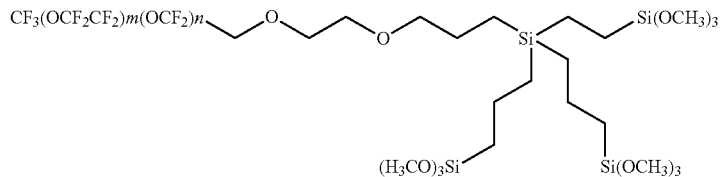

(m ≈ 21, n ≈ 35)

Synthetic Example 9

A polyether group-containing compound (I) was obtained in the same manner as in Synthetic Example 7 and Synthetic Example 8 except that methyldichlorosilane was used.

Polyether Group-Containing Compound (I)

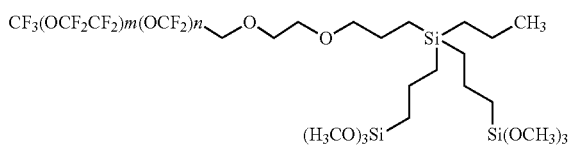

(m ≈ 22, n ≈ 21)

Synthetic Example 10

First, 4.0 g of $CF_3$—$(OCF_2CF_2)_m$—$(OCF_2)_n$—$CH_2OH$ (m≈22, n≈21) was dissolved in 8 g of 1,3-bis(trifluoromethyl)benzene, then 0.4 g of sodium hydroxide was added, and the mixture was stirred at 80° C. for 1 hour. To this solution was added 1.0 g of $CH_2$=$CH CH_2OCH_2CH_2OCH_2CH_2OTf$, and the mixture was reacted at 80° C. for 1 hour. The end point of the reaction was confirmed by $^1$H-NMR according to that the chemical shift of the terminal hydroxyl group α position —$CH_2$— of the compound (B) shifted to a low magnetic field. The reaction solution was returned to room temperature, and 3 ml of 1 N hydrochloric acid was added. The separated lower layer was washed with water, dried over magnesium sulfate, filtered, and concentrated, and thus a polyether group-containing compound (J) was obtained.

Polyether Group-Containing Compound (J)

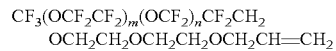

(m≈22, n≈21)

Synthetic Example 11

A polyether group-containing compound (K) was obtained in the same manner as in Synthetic Example 4 and Synthetic Example 5 except that 2.5 g of the polyether group-containing compound (J) was used.

Polyether Group-Containing Compound (K)

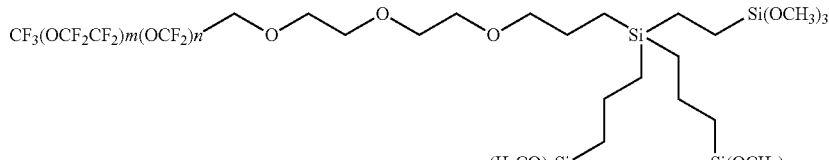

(m ≈ 22, n ≈ 21)

Synthetic Example 12

A polyether group-containing compound (L) was obtained in the same manner as in Synthetic Example 6, Synthetic Example 7, and Synthetic Example 8 except that 3.0 g of $CF_3$—$(OCF_2CF_2)_m$—$(OCF_2)_n$—$CH_2OH$ (m≈22 and n 21) was used.

Polyether Group-Containing Compound (L)

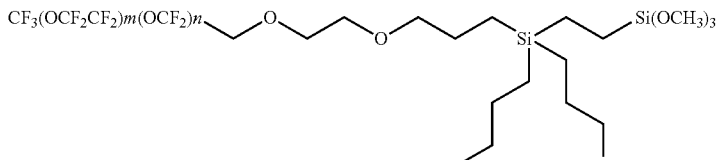

(m ≈ 22, n ≈ 21)

Synthetic Example 13

A polyether group-containing compound (M) was obtained in the same manner as in Synthetic Example 12 except that methyldichlorosilane was used.

Polyether Group-Containing Compound (M)

$CF_3(OCF_2CF_2)_m(OCF_2)_n$—O—CH$_2$CH$_2$—O—CH$_2$CH$_2$CH$_2$—Si(CH$_3$)(CH$_2$CH$_2$CH$_2$Si(OCH$_3$)$_3$)$_2$ (m ≈ 22, n ≈ 21)

Example 1

The polyether group-containing compound (E) obtained in Synthetic Example 5 was dissolved in hydrofluoroether (Novec HFE-7200, manufactured by 3M) so as to have a concentration of 0.1 mass %, and thus a surface-treating agent (1) was prepared.

Example 2

The polyether group-containing compound (H) obtained in Synthetic Example 7 was dissolved in hydrofluoroether (Novec HFE-7200, manufactured by 3M) so as to have a concentration of 0.1 mass %, and thus a surface-treating agent (2) was prepared.

Example 3

The polyether group-containing compound (I) obtained in Synthetic Example 8 was dissolved in hydrofluoroether (Novec HFE-7200, manufactured by 3M) so as to have a concentration of 0.1 mass %, and thus a surface-treating agent (3) was prepared.

Example 4

The polyether group-containing compound (K) obtained in Synthetic Example 11 was dissolved in hydrofluoroether (Novec HFE-7200, manufactured by 3M) so as to have a concentration of 0.1 mass %, and thus a surface-treating agent (4) was prepared.

Example 5

The polyether group-containing compound (L) obtained in Synthetic Example 12 was dissolved in hydrofluoroether (Novec HFE-7200, manufactured by 3M) so as to have a concentration of 0.1 mass %, and thus a surface-treating agent (5) was prepared.

Example 6

The polyether group-containing compound (M) obtained in Synthetic Example 13 was dissolved in hydrofluoroether (Novec HFE-7200, manufactured by 3M) so as to have a concentration of 0.1 mass %, and thus a surface-treating agent (6) was prepared.

Comparative Examples 1 and 2

Comparative surface-treating agents (1) and (2) were respectively prepared in the same manner as in Example 2 except that the following control compounds (1) and (2) were used in place of the polyether group-containing compound (D)

$CF_3CF_2CF_2$—$(OCF_2CF_2CF_2)_{23}$—$OCF_2$CH$_2$OCH$_2$CH$_2$CH$_2$Si(OCH$_3$)$_3$    Control Compound (1)

$CF_3CF_2CF_2CF_2CF_2$CH$_2$CH$_2$CH$_2$Si(OCH$_2$CH$_3$)$_3$    Control Compound (2)

(Formation of Cured Film)

The surface-treating agents (1) to (6) and the comparative surface-treating agents (1) to (2) were used to form cured films as follows.

A surface-treating agent or a comparative surface-treating agent was applied to a chemically tempered glass ("Gorilla" glass, manufactured by Corning Incorporated, thickness 0.7 mm) using a spin coater. The spin coating conditions were 300 rpm for 3 seconds and 2000 rpm for 30 seconds. The coated glass was heated at 150° C. for 30 minutes in a constant-temperature vessel in air to form a cured film.

[Evaluation of Cured Film Properties]

Properties of the resulting cured film were evaluated as follows.

<Static Contact Angle>

The static contact angle was measured by the following method using a fully automatic contact angle meter Drop-Master 700 (manufactured by Kyowa Interface Science Co., Ltd.).

(Method for Measuring Static Contact Angle)

The static contact angle was determined by dripping 2 µL of water from a microsyringe onto a horizontally placed substrate and taking a still image with a video microscope 1 second after the dripping.

(Initial Evaluation)

First, as an initial evaluation, after the cured film was formed, the static water contact angle of the surface with which nothing was brought into contact yet was measured.

(Evaluation after Wiping with Ethanol)

The above cured film was then wiped back and forth five times with Kimwipe (trade name, manufactured by Jujo Kimberly Co., Ltd.) sufficiently soaked with ethanol, and dried. After drying, the static water contact angle of the cured film was measured.

<Fingerprint Adherability and Removability by Wiping>

(Fingerprint Adherability)

A finger was pressed against a cured film formed using a surface-treating agent or a comparative surface-treating agent, and how easily a fingerprint adheres was visually judged. Evaluations were made according to the following criteria:

A: Fingerprint unlikely adhered, or not noticeable even when adhered.
 B: Adhered fingerprint was little, but fingerprint sufficiently confirmed.
 C: Fingerprint adhered as clearly as fingerprint on untreated glass substrate.

(Fingerprint Removability by Wiping)

After the above fingerprint adherability test, the adhered fingerprint was wiped off back and forth five times with Kimwipe (trade name, manufactured by Jujo Kimberly Co., Ltd.), and how easily the adhered fingerprint was wiped off was visually judged. Evaluations were made according to the following criteria:

A: Fingerprint completely wiped off.
 B: Fingerprint wiping marks remained.
 C: Fingerprint wiping marks spread, and difficult to remove.

The results of the series of evaluations are summarized in Table 1 below.

TABLE 1

| Treatment agent | | Contact angle (degree) | | Fingerprint adherability and removability | |
|---|---|---|---|---|---|
| | | Initial evaluation | After wiping with ethanol | Fingerprint adherability | Fingerprint removability by wiping |
| Surface-treating agent (1) | Example 1 | 114 | 114 | A | A |
| Surface-treating agent (2) | Example 2 | 115 | 115 | A | A |
| Surface-treating agent (3) | Example 3 | 115 | 115 | A | A |
| Surface-treating agent (4) | Example 4 | 116 | 116 | A | A |
| Surface-treating agent (5) | Example 5 | 114 | 114 | A | A |
| Surface-treating agent (6) | Example 6 | 114 | 114 | A | A |
| Comparative surface-treating agent (1) | Comparative Example 1 | 113 | 112 | A | B |
| Comparative surface-treating agent (2) | Comparative Example 2 | 105 | 103 | B | C |

The contact angles of the cured films formed using the surface-treating agents (1) to (6) were not decreased even when the films were wiped using ethanol. On the other hand, the contact angles of the cured films formed using the comparative surface-treating agents (1) and (2) were decreased when the films were wiped using ethanol. This is considered to be because the cured films formed with the comparative surface-treating agent (1) and (2) have poor chemical resistance (solvent resistance).

<Evaluation of Cured Film Abrasion Resistance>

The abrasion resistance of the resulting cured film was evaluated as follows.

<Abrasion Resistance Test with Eraser>

Using a rubbing tester (manufactured by Shinto Scientific Co., Ltd.), the water-resisting contact angle was measured every 2,500 rubs under the following conditions, and the test was continued until it reached 10,000 rubs or until the angle became less than 100°. The test environment conditions are 25° C. and a humidity of 40% RH.

Eraser: Raber Eraser (manufactured by Minoan)
Contact area: 6 mmφ
Moving distance (one way): 30 mm
Moving speed: 3,600 mm/min
Load: 1 kg/6 mmφ

The results of the above evaluation are summarized in Table 2 below.

TABLE 2

| Treatment agent | | Eraser friction count | | | | |
|---|---|---|---|---|---|---|
| | | 0 times | 2,500 times | 5,000 times | 7,500 times | 10,000 times |
| Surface-treating agent (1) | Example 1 | 114 | 111 | 108 | 104 | 101 |
| Surface-treating agent (2) | Example 2 | 114 | 110 | 105 | 103 | 100 |
| Surface-treating agent (3) | Example 3 | 115 | 107 | 104 | 101 | 85 |
| Surface-treating agent (4) | Example 4 | 115 | 112 | 110 | 106 | 104 |
| Surface-treating agent (5) | Example 5 | 115 | 113 | 111 | 106 | 101 |
| Surface-treating agent (6) | Example 6 | 114 | 110 | 105 | 102 | 99 |
| Comparative surface-treating agent (1) | Comparative Example 1 | 113 | 89 | — | — | — |

It was confirmed from the above results that surface-treating agents containing the compound of the present invention having a polyether structure between a fluoropolyether group and a Si atom having a hydrolyzable group exhibits high abrasion resistance.

INDUSTRIAL APPLICABILITY

The article of the present disclosure can be suitably used in various applications as, for example, an optical member such as a touch panel.

What is claimed is:

1. A fluoropolyether group-containing silane compound represented by the following formula (I):

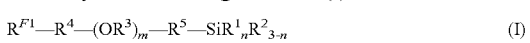

$$R^{F1}-R^4-(OR^3)_m-R^5-SiR^1{}_nR^2{}_{3-n} \quad (I)$$

wherein $R^{F1}$ is $Rf^1-R^F-O_p-$;

$Rf^1$ is a $C_{1-16}$ alkyl group optionally substituted with one or more fluorine atoms;

$R^F$ is a divalent fluoropolyether group;

p is 0 or 1;

$R^1$ is each independently at each occurrence $-Z-SiR^{11}{}_qR^{12}{}_{3-q}$;

Z is a divalent organic group;

$R^{11}$ is each independently at each occurrence a hydroxyl group or a hydrolyzable group;

$R^{12}$ is each independently at each occurrence a hydrogen atom or a monovalent organic group;

q is an integer of 1 to 3;

$R^2$ is a hydrogen atom or a monovalent organic group;

n is 2 or 3;

$R^3$ is a $C_{1-6}$ alkylene group;

m is an integer of 2 to 10;

$R^4$ is a single bond or a $C_{1-6}$ alkylene group; and $R^5$ is a single bond or a $C_{1-6}$ alkylene group.

2. The fluoropolyether group-containing silane compound according to claim 1, wherein $Rf^1$ is a $C_{1-16}$ perfluoroalkyl group.

3. The fluoropolyether group-containing silane compound according to claim 1, wherein $R^F$ is a group represented by the following formula:

$$—(OC_6F_{12})_a—(OC_5F_{10})_b—(OC_4F_8)_c—(OC_3R^{Fa}_6)_d—(OC_2F_4)_e—(OCF_2)_f—$$

wherein $R^{Fa}$ is each independently at each occurrence a hydrogen atom, a fluorine atom, or a chlorine atom; and a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula, provided that when all $R^{Fa}$ are hydrogen atoms or chlorine atoms, at least one of a, b, c, e, and f is 1 or more.

4. The fluoropolyether group-containing silane compound according to claim 3, wherein $R^{Fa}$ is a fluorine atom.

5. The fluoropolyether group-containing silane compound according to claim 1, wherein $R^F$ is each independently at each occurrence a group represented by the following formula (f1), (f2), (f3), (f4), or (f5):

$$—(OC_3F_6)_d—(OC_2F_4)_e— \quad (f1)$$

wherein d is an integer of 1 to 200; and e is 0 or 1;

$$—(OC_4F_8)_c—(OC_3F_6)_d—(OC_2F_4)_e—(OCF_2)_f— \quad (f2)$$

wherein c and d are each independently an integer of 0 to 30;

e and f are each independently an integer of 1 to 200;

the sum of c, d, e, and f is an integer of 10 to 200; and the occurrence order of the respective repeating units enclosed in parentheses provided with a subscript c, d, e, or f is not limited in the formula;

$$—(R^6—R^7)_g— \quad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups selected from these groups; and g is an integer of 2 to 100;

$$—(OC_6F_{12})_a—(OC_5F_{10})_b—(OC_4F_8)_c—(OC_3F_6)_d—(OC_2F_4)_e—(OCF_2)— \quad (f4)$$

wherein e is an integer of 1 or more and 200 or less; a, b, c, d, and f are each independently an integer of 0 or more and 200 or less; and the occurrence order of the respective repeating units enclosed in parentheses provided with a, b, c, d, e, or f is not limited in the formula; and $$—(OC_6F_{12})_a—(OC_5F_{10})_b—(OC_4F_8)_c—(OC_3F_6)_d—(OC_2F_4)_e—(OCF_2)_f— \quad (f5)$$

wherein f is an integer of 1 or more and 200 or less; a, b, c, d, and e are each independently an integer of 0 or more and 200 or less; and the occurrence order of the respective repeating units enclosed in parentheses provided with a, b, c, d, e, or f is not limited in the formula.

6. The fluoropolyether group-containing silane compound according to claim 1, wherein $R^3$ is a $C_{1-3}$ alkylene group.

7. The fluoropolyether group-containing silane compound according to claim 1, wherein m is an integer of 2 to 6.

8. The fluoropolyether group-containing silane compound according to claim 1, wherein Z is a $C_{1-6}$ alkylene group.

9. The fluoropolyether group-containing silane compound according to claim 1, wherein q is 3.

10. A surface-treating agent comprising the fluoro (poly) ether group-containing silane compound according to claim 1.

11. The surface-treating agent according to claim 10, further comprising one or more further components selected from a fluorine-containing oil, a silicone oil, and a catalyst.

12. The surface-treating agent according to claim 10, further comprising a solvent.

13. The surface-treating agent according to claim 10, which is used as an antifouling coating agent or a waterproof coating agent.

14. The surface-treating agent according to claim 10, which is for vacuum deposition.

15. A pellet comprising the surface-treating agent according to claim 10.

16. An article comprising a substrate and a layer on a surface of the substrate, wherein the layer is formed of the fluoropolyether group-containing silane compound according to claim 1.

17. The article according to claim 16, which is an optical member.

18. An article comprising a substrate and a layer on a surface of the substrate, wherein the layer is formed of the surface-treating agent according to claim 10.

19. The article according to claim 18, which is an optical member.

* * * * *